Aug. 4, 1942.　　　　H. DAVIDS　　　　2,292,104
REVERSIBLE OPPOSED PISTON ENGINE
Filed March 17, 1941　　　5 Sheets-Sheet 1

INVENTOR.
HANS DAVIDS
ATTORNEY.

FIG.3.

Aug. 4, 1942.  H. DAVIDS  2,292,104
REVERSIBLE OPPOSED PISTON ENGINE
Filed March 17, 1941  5 Sheets-Sheet 3

INVENTOR.
HANS DAVIDS
BY Paul L. Kiohu
ATTORNEY

Patented Aug. 4, 1942

2,292,104

UNITED STATES PATENT OFFICE 2,292,104

REVERSIBLE OPPOSED PISTON ENGINE

Hans Davids, Beloit, Wis., assignor to Fairbanks, Morse & Co., Chicago, Ill., a corporation of Illinois Application March 17, 1941, Serial No. 383,681

15 Claims. (Cl. 123—41)

This invention relates to internal combustion engines of reversible, opposed piston type, characterized by spaced crankshafts interconnected for synchronous rotation in either direction of engine operation, the invention having particular reference to crankshaft interconnecting or coupling mechanism embodying improved means operable automatically in response to reversals of engine operation, for determining the phase relationship of the crankshafts such that one leads the other by a predetermined desired angle in both forward and reverse operations of the engine.

The principal object of the present invention resides in the provision in an engine of the character indicated, of an effective and compact crankshaft synchronizing drive assembly in which is incorporated improved mechanism for adjusting or determining the crankshaft phase relationship in accordance with the direction of engine operation, the phase adjusting mechanism being operable automatically in response to operation of engine reversing control means and to reversals in the direction of crankshaft rotation.

Other important objects and advantages of the invention will appear readily from the following description of a preferred embodiment thereof, as exemplified in the accompanying drawings, in which:

Figures 1, 2:
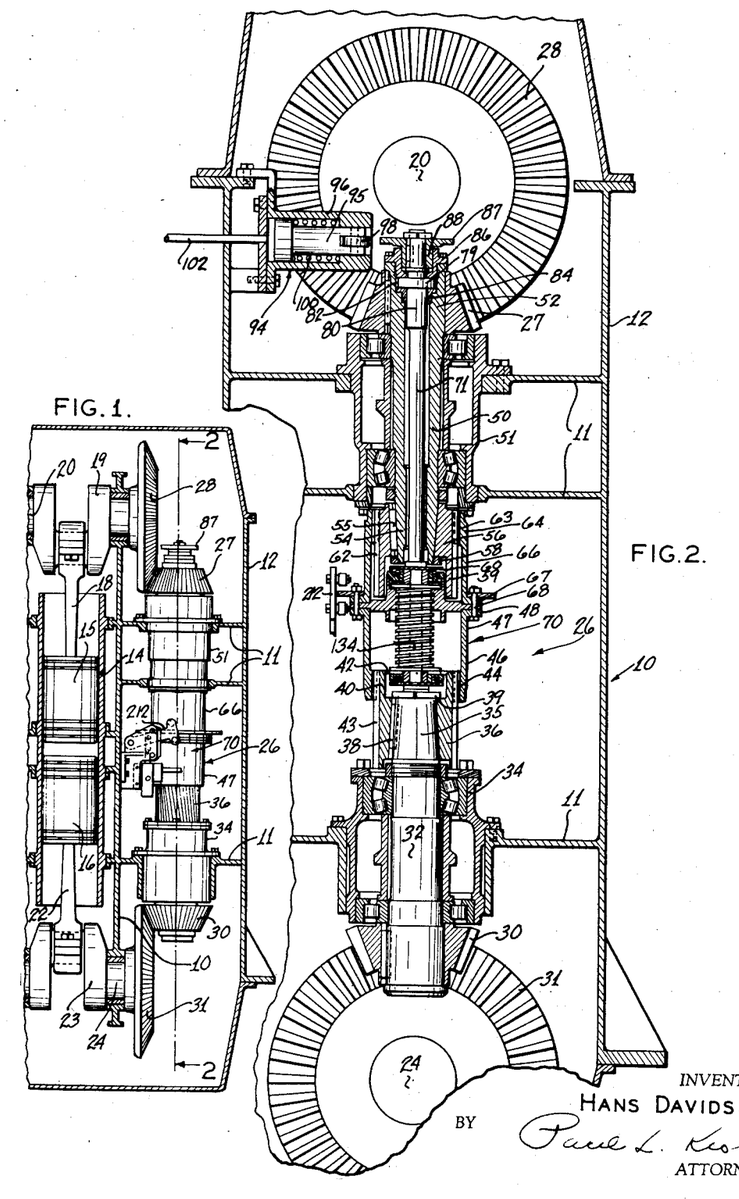
Fig. 1 is a vertical section longitudinally through one end portion of an internal combustion engine, showing upper and lower crankshafts interconnected by a synchronizing drive means in which is incorporated the improvements provided by the present invention.
Fig. 2 is an enlarged vertical section taken transversely of the engine through the drive means, as along the line 2—2 in Fig. 1.

Referring to the drawings by appropriate characters of reference, there is illustrated by Fig. 1, one end portion of an internal combustion engine of reversible, opposed piston type, to which the present invention is applied. As shown, the engine includes a frame structure indicated generally at 10, and including vertically spaced, horizontal deck plates 11 and housing 12. Suitably supported by the deck plates is a cylinder 14, in which are operatively disposed a pair of pistons 15 and 16 arranged in opposed relation. A rod 18 operatively connects the upper piston 15 to the crank 19 of the upper crankshaft 20, while a rod 22 similarly operatively connects the lower piston 16 to the crank 23 of the lower crankshaft 24. The crankshafts extend in parallel relation, longitudinally of the engine, and each is suitably rotatably journalled in the frame 10. Interconnecting the crankshafts for synchronous rotation in both forward and reverse engine operation, is a coupling assembly designated generally by the numeral 26, arranged vertically in the end portion of the engine shown by Fig. 1, and embodying crankshaft phase adjusting mechanism presently to be described. The coupling preferably is located forwardly of the corresponding ends of the crankshafts and extends therebetween, being operatively connected to the upper crankshaft 20 through a bevelled coupling pinion 27 enmeshing a bevelled crankshaft gear 28, and to the lower crankshaft 24 in a similar manner, as through bevelled coupling pinion 30 enmeshing bevelled crankshaft gear 31. It is to be noted here, that the engine shown is preferably of the Diesel type, and while but one cylinder organization is illustrated, the engine may be either single or multi-cylinder in character.

As shown particularly by Fig. 2, the crankshaft synchronizing coupling includes a lower, vertically arranged shaft element 32, to the lower end of which is keyed or otherwise secured, the bevelled pinion 30. The shaft 32 is suitably journalled for rotation in a journal box or bearing assembly 34 which is supported by the lowermost deck plate 11. The upper end 35 of shaft 33 is preferably tapered, and seated thereon is a gear member 36, the gear member being secured for rotation with the shaft end, as by the key element 38, and retained against movement longitudinally of the shaft by a suitable collar 39 threadedly engaging the shaft end and abutting the adjacent end portion of the member. The gear member is extended upwardly beyond the shaft, as by the cylindrical section 40 which is internally recessed, as at 42, to accommodate and receive therein, parts of the phase adjusting mechanism presently to be described, while formed on the periphery of the member and extending substantially from end to end thereof, are skewed or spirally directed gear teeth or splines 43. Operatively engaging the splines 43 are similarly spiralled gear teeth or splines 44 formed on and internally of the lower end 46 of a hollow, cylindrical coupling member 47. The upper end of the coupling member is provided with an external flange 48 for a purpose to appear.

In a similar manner, an upper vertical shaft element 50 which is arranged in substantial axial alignment with the lower shaft 32 and spaced therefrom as shown, is rotatably journalled in a journal box or bearing assembly 51 supported by the uppermost pair of deck plates 11. To the upper end 52 of shaft 50 is secured or keyed the bevelled pinion 27 heretofore noted, which enmeshes the bevelled gear 28 on the upper crankshaft. The lower end 54 of shaft 50 is preferably tapered, and secured thereon by the key connection 55, is a gear member 56 which is retained against movement longitudinally of the shaft by a suitable collar 58 threadedly engaging the lower end of the shaft and abutting the adjacent end of the member. The gear member 56 is similar in major respects, to the lower gear member 36, being provided with an extension 59 beyond the shaft end and recessed, as at 60, to receive parts of the phase adjusting mechanism hereinafter described, and further, having formed on its periphery gear teeth or splines 62 which are skewed or spiralled in substantially equal angular degree but oppositely directed relative to the splines 43 of the lower gear member. Engaging the splines 62 are similarly spiralled splines 63 formed internally of the upper end 64 of a hollow, cylindrical coupling member 66, the lower end of the member being provided with an external annular flange 67 as shown.

The coupling members 47 and 66 constitute complementary elements of the crankshaft synchronizing connection, and are rigidly connected together through the coupling flanges 48 and 67, as by suitable bolts 68. When so connected, the coupling members provide what may be termed a coupling sleeve, referred to hereinafter by the reference numeral 70, which serves to rotatably interconnect the crankshaft driven shaft elements 32 and 50 of the synchronizing drive. Moreover, through the axial spacing of the coupling shaft gear members 36 and 56, the relative length of the coupling sleeve 70 and its splined connection to the gear members, the sleeve is adapted for displacement longitudinally of the gear members between predetermined limits, for a purpose presently to appear.

According to the present exemplary embodiment of the invention, the synchronizing coupling assembly is adapted for interconnecting engine crankshafts which rotate in opposite directions, in both the forward and reverse operations of the engine. Thus the coupling pinions 27 and 30 engage the respective crankshaft gears 28 and 31 in the plane of the crankshaft axes and inwardly of such axes (Figs. 1 and 2). Such arrangement provides for a relatively short and compact synchronizing coupling assembly which facilitates accommodation and mounting of the coupling in a relatively limited space within the engine frame and housing.

Figure 3:
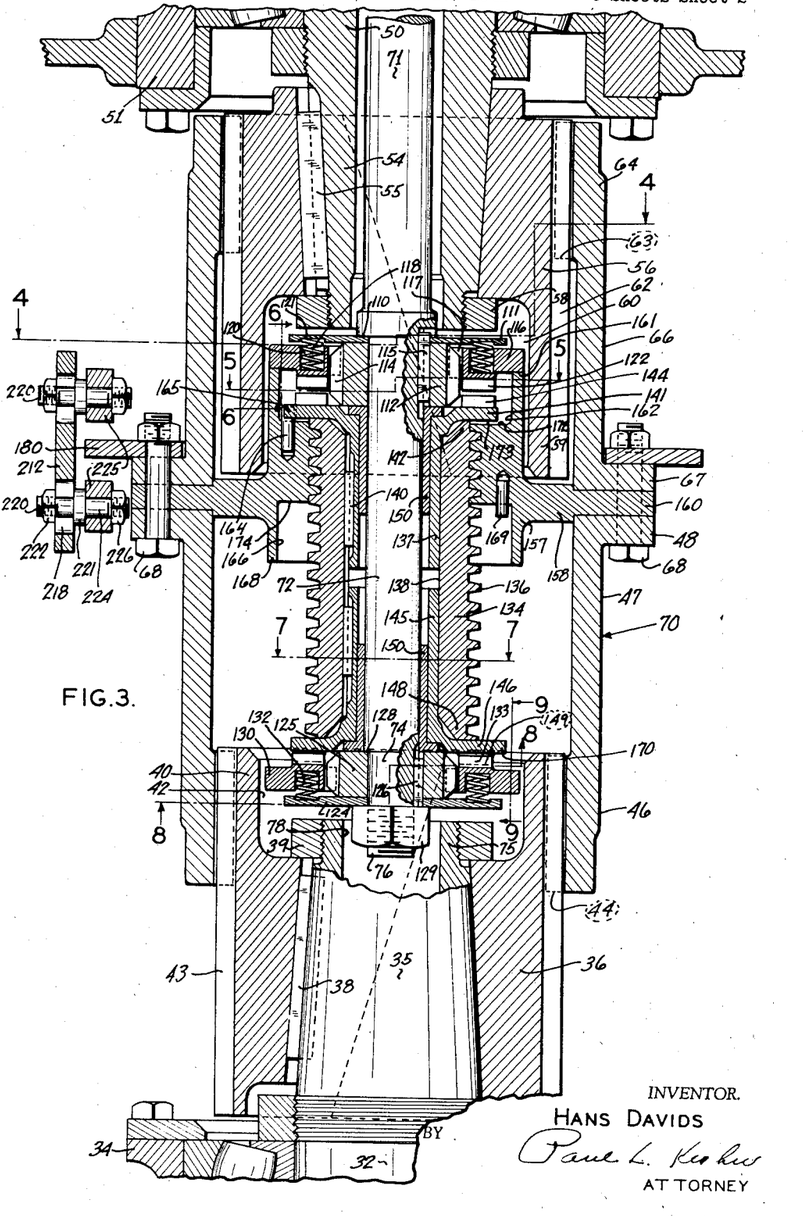
Fig. 3 is an enlarged vertical section transversely through the major portion of the crankshaft interconnecting drive means, showing the crankshaft phase adjusting mechanism forming a part thereof.

In the interest of efficiency in the operation of an engine of the character disclosed, as well as for other well known reasons, it is desirable that say the lower crankshaft and its connected piston or pistons lead the upper crankshaft and the piston or pistons connected thereto, in both the forward and reverse operations of the engine. Accordingly, the desired phase adjustment of the crankshaft assemblies is effected automatically upon reversals of engine operation, through control mechanism embodied in the crankshaft coupling device and forming the principal subject of the present invention. Preliminary to a description of the improved phase adjusting mechanism, it will be observed from Figs. 1, 2 and 3 in particular, that in the coupling assembly as thus far described, displacement of the coupling sleeve 70 longitudinally of the coupling axis will produce relative rotation of the coupling shaft elements 32 and 50, and hence a corresponding relative angular movement of the crankshafts. Such obtains of course, by reason of the oppositely directed, spiral splines on the coupling shaft gears 36 and 56, engaged by similarly directed spiral splines on the sleeve 70, and through the arrangement of the sleeve for displacement longitudinally of the coupling. The limits of sleeve displacement are determined by means presently to appear, and in the present exemplary application of the coupling, the longitudinal travel of the sleeve 70 is limited such that when the sleeve is disposed in the lower limit, as shown in the diagrammatic view of Fig. 14 which illustrates the relation of the parts in the forward or "ahead" operation of the engine, the lower crankshaft will be advanced relative to the upper crankshaft, to obtain substantially a 12° angular lead of the lower crank arm 23 over the upper crank arm 19. This of course, serves to advance the travel of the lower piston relative to that of the upper piston, in the cylinder assembly with which the particular crank arms are associated (Fig. 1). As shown by the arrows in Fig. 14, the lower crankshaft rotates in the clockwise direction, while the upper crankshaft rotates in the counterclockwise direction, in the forward operation of the engine. In the reverse or "astern" operation of the engine, the coupling sleeve 70 is disposed in the upper limit of its displacement, as shown in Figs. 1, 2 and 3, and in the diagrammatic view of Fig. 15, the latter illustrating the relative positions of the crank arms and coupling parts upon engine reversal. In such position of the sleeve 70 and by reason of its displacement from the lower limit to the upper limit, the relative positions of the upper and lower crank arms 19 and 23 are determined such that the lower crank arm 23 leads the upper crank arm 19 by approximately 8°, as indicated in Fig. 15, with the lower crankshaft rotating in the counterclockwise direction and the upper crankshaft clockwise (Fig. 15). Thus from the foregoing, it follows that in each reversal of engine operation in the exemplary embodiment illustrated, the total angular shift of the lower crankshaft arm 23 over the upper crankshaft arm 19 is substantially 20°. In order to obtain this angular degree of crankshaft phase adjustment, it will be now appreciated that in the coupling assembly as shown and described, the angular degree of spiral in the splined connections between the coupling sleeve 70 and coupling shaft gears 36 and 56, and the longitudinal displacement limits of the sleeve 70, must be predetermined and correlated with the gear-ratio between the coupling pinions 27 and 30 and crankshaft gears 28 and 31, so that displacement of the sleeve 70 from one limit of its travel to the other, will effect the desired 20° total shift and hence the desired advance or lead of the lower crank 23 relative to the upper crank 19.

It is to be noted here as a feature inherent in the crankshaft synchronizing coupling of the character disclosed, that the coupling is fully capable of compensating for thermal expansion or contraction of its parts, by reason of the splined connections between the coupling sleeve 70 and the coupling shaft gears 36 and 56, as this will be readily understood. Also, whatever slight thermal deformations which may occur in the engine frame, and particularly the frame deck plates 11 by which the coupling is supported, will be cared for by corresponding self-adjustment of the coupling mechanism.

As before indicated, the mechanism for effecting the crankshaft phase adjusting displacement of the coupling sleeve 70, forms the principal subject of the present invention, and is embodied in the crankshaft coupling structure. Referring particularly to Figs. 2 and 3, the upper coupling shaft 50 is axially bored to receive therethrough a shaft element or spindle 71, the spindle including a portion 72 of reduced diameter projecting downwardly beyond the lower end of the shaft 50 and terminating in an end portion 74 further reduced in diameter, located adjacent the upper end 75 of the lower coupling shaft 32. By preference, the terminal portion 76 of the lower spindle end 74 is received in an axial recess or bore 78 in the lower shaft 32, as shown in Fig. 3. The spindle is constrained against axial movement relative to the coupling shaft 50, in any suitable manner, as by an annular collar or flange 79 secured to or formed integrally with the upper spindle end 80 (Fig. 2) and received in an enlarged bore or recess 82 in the upper end 52 of the shaft 50. The collar may be confined therein, between a spindle bushing 84 and a retaining member 86 removably secured to the shaft end.

Figures 10, 11, 12, 13:
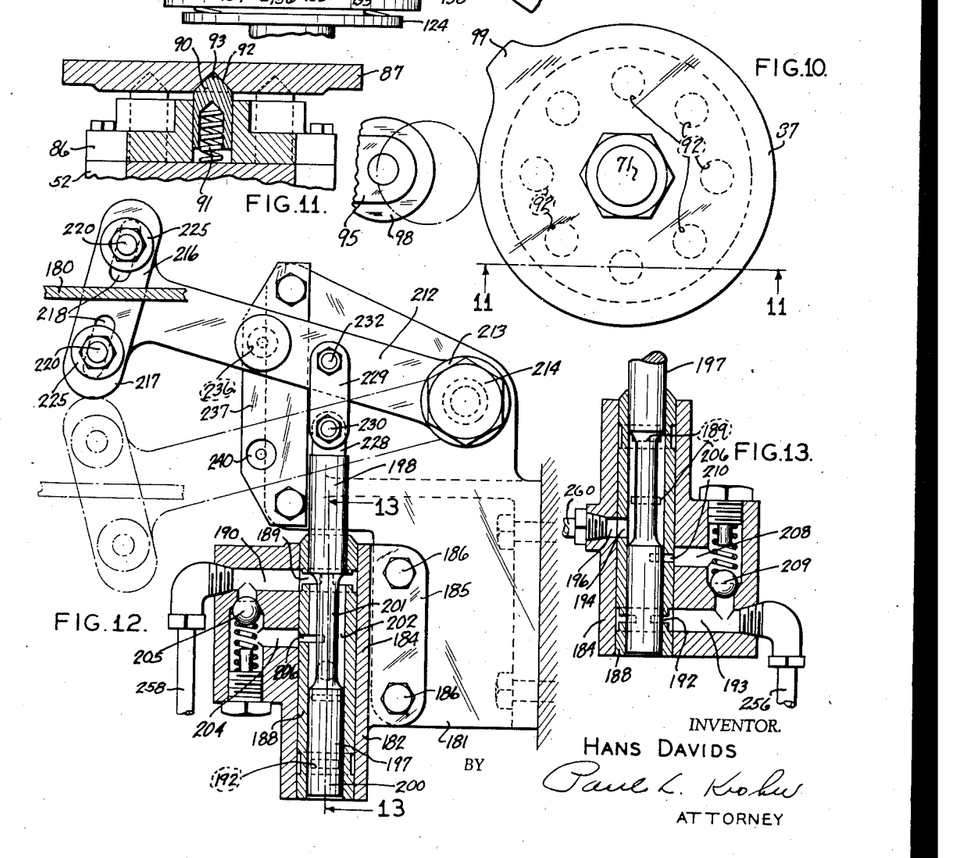
Fig. 10 is a plan view of the upper end of the drive means, showing control means for the phase adjusting mechanism.
Fig. 11 is a vertical section through the control means of Fig. 10, as taken along the line 11—11 in the latter figure.
Fig. 12 is a detail elevation, partly in section, of fluid control valve mechanism associated with the phase adjusting mechanism, the view being taken from the line 12—12 in Fig. 4.
Fig. 13 is a sectional elevation through the valve, as taken along the line 13—13 in Fig. 12.

The spindle normally rotates with the shaft 50 during operation of the engine in either direction, being driven from the latter shaft through a releasable, clutch-type connector device shown by Figs. 2 and 11. The clutch device for the purpose of the present embodiment, comprises a generally circular plate or disc 87 having a hub 88 engaging and being keyed or otherwise secured to, the upper end 80 of the spindle 71. A plurality of plunger elements 90 are carried by the member 86, and each is urged upwardly toward the disc 87 by a suitable compression spring 91. The under surface of the disc is provided with recesses 92 equal in number to the number of plungers employed in the clutch assembly, these recesses receiving the upper rounded ends 93 of the plungers 90 to provide the drive connection between the shaft 50 and spindle 71.

As will presently more fully appear, the spindle 71 forms a part of the crankshaft phase adjusting mechanism and serves as a control element therefor. During engine reversal and until the engine attains a normal running condition in the changed direction, the spindle is held against rotation preferably by an applied force acting on the disc 87, and of such magnitude as to overcome the pressure of the plunger springs 91, so that the plungers will be caused to slip in and out of the disc recesses 92 as the coupling shaft 50 is rotated. In the present example, such applied force is effected through a pressure device indicated generally at 94, and including a fluid actuated piston-plunger 95 operating in a cylinder 96 suitably supported on the engine frame (Fig. 2). The plunger 95 is projectible through one end of the cylinder, and the exposed end thereof carries a suitable roller 98 adapted for engagement with the periphery of the clutch plate 87. As appears in Fig. 10, the plate or disc 87 is formed with a radial, peripheral abutment or projection 99 adapted for engagement with the roller 98. A suitable spring 100 is arranged in the cylinder 96 to retract the plunger 95, while fluid under pressure, as air, is admitted to the cylinder through a conduit 102. In engines of the character disclosed, it is common practice to employ air under pressure for engine starting and reversing, and such a system is contemplated in connection with the engine illustrated, as this is indicated in part, in the diagrammatic views of Figs. 14 and 15. Accordingly, the air in such system may provide the source of fluid pressure for actuating the plunger 95, as this will appear hereinafter.

Figure 4:
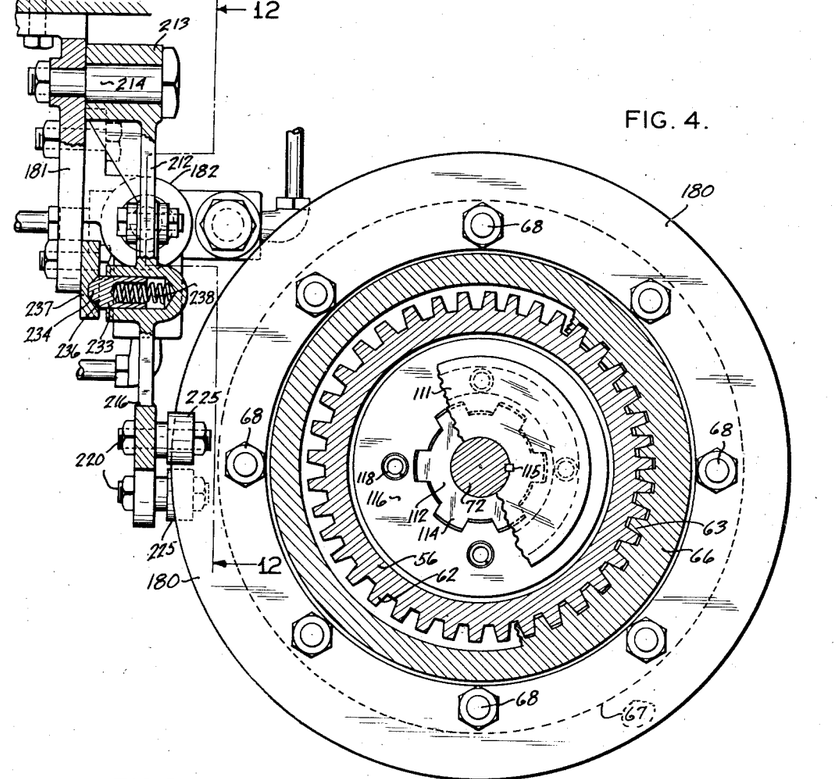
Fig. 4 is a horizontal section through the drive means, as taken along the stepped line 4—4 in Fig. 3.
Figure 5:
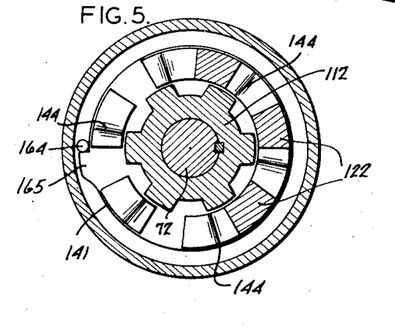
Fig. 5 is a horizontal section through the phase adjusting mechanism, as viewed from line 5—5 in Fig. 3.
Figure 6:
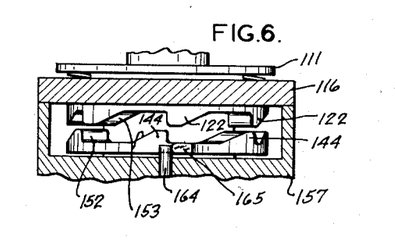
Fig. 6 is a vertical view partly in section, of a portion of the phase adjusting mechanism, as viewed from line 6—6 in Fig. 3.
Figures 7, 8, 9:
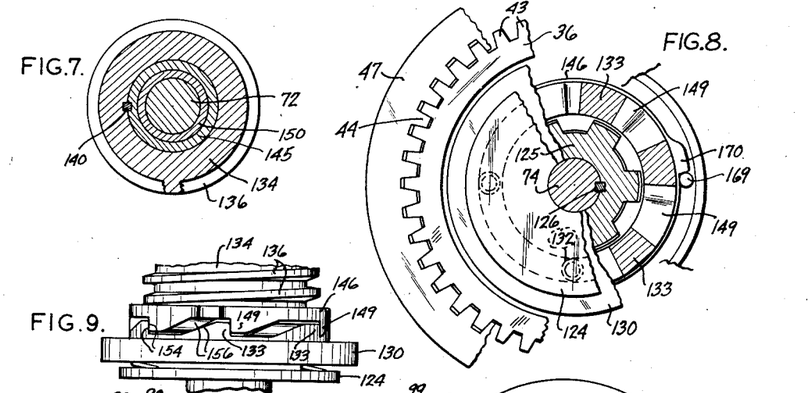
Fig. 7 is a horizontal section through another portion of the mechanism, as taken along line 7—7 in Fig. 3.
Fig. 8 is a horizontal section through yet another portion of the mechanism, as viewed from line 8—8 in Fig. 3.
Fig. 9 is a vertical view of a portion of the mechanism, as viewed from line 9—9 in Fig. 3.

Referring now in particular to Fig. 3 and to the detail views of Figs. 4 through 9, the spindle 71 is provided with an annular shoulder 110 at the juncture of its upper portion and the reduced diameter section 72, the shoulder 110 being located in the zone of the lower end of the upper coupling shaft 50. Seated on the spindle section 72 against the shoulder 110, is a washer-like element or disc 111, while abutting the disc therebelow, is a ring member 112 sleeved on the spindle section 72 and formed on its periphery with splines 114 directed parallel to the spindle axis. Both disc 111 and member 112 are secured for rotation with the spindle, preferably by a single key element 115. An annular clutch member 116 is arranged on the ring member 112 and is provided with splines 117 on its inner annular surface, for operative engagement with the ring splines 114, whereby the clutch member rotates with the ring and is capable of displacement longitudinally of the ring member. The clutch member is urged downwardly, away from the disc 111, by compression springs 118 seated in relatively deep recesses 120 in the clutch member and bearing against the disc, in relatively shallow recesses 121 therein (Figs. 3 and 4). The lower face of the member 116 has formed thereon and inwardly of its periphery, clutch teeth or lugs 122 to be described in greater detail hereinafter.

At the lower end of the spindle and on the reduced diameter end portion 74, is a clutch assembly corresponding to that above described, but having its elements arranged in the reverse order as indicated in Fig. 3. This assembly comprises disc 124 and splined ring 125 keyed at 126, to the spindle portion 74 and confined against axial displacement thereon, between spindle shoulder 128 and an assembly nut 129 threaded on the terminal portion 76 of the spindle. Annular clutch member 130 similar to the clutch member 116, has a splined connection with the splined ring member 125 for rotation therewith, as well as longitudinal displacement relative thereto, and is urged upwardly away from the disc 124 by springs 132. The upper face of the clutch member 130 has formed thereon, inwardly of its periphery, clutch teeth or lugs 133 of a character later to appear.

Arranged on the spindle section 72 and between the clutch assemblies hereinabove described, is a gear assembly embodying complementary clutch elements which complete the aforesaid clutch assemblies, as this will presently appear. The gear assembly comprises a cylindrical member 134 having formed on its surface a spiral thread 136 continuous from end to end of the member. A sleeve element 137 is endwise received in the bore 138 of the member 134 and is secured to the latter as by a key 140. The upper end of the sleeve element is provided with an annular, lateral flange 141 in abutment with the upper end 142 of member 134. Formed on the upper face of the flange 141 are clutch teeth or lugs 144 adapted for clutch-cooperation with the clutch teeth 122 of clutch member 116. A similar sleeve element 145 is also received in the bore 138 and is provided with a lateral, annular flange 146 in abutment with the lower end 148 of the gear member 134. On the lower face of the flange 146 are teeth or lugs 149 (Fig. 9) adapted for clutch engagement with the teeth 133 on the lower clutch member 130. Flanged bushings 150 serve to seat the gear assembly on the spindle section 72 such that the assembly is free on the spindle, the bushings further serving, in abutment with the upper and lower ring members 112 and 125, to constrain the gear assembly against displacement longitudinally of the spindle.

From the description of the crankshaft phase adjusting mechanism thus far, it will be observed that the springs 118 in the upper clutch assembly, serve to displace the member 116 downwardly to engage its clutch teeth 122 with the teeth 144 on flange 141 of member 137, while the springs 132 in the lower clutch assembly, function similarly to cause engagement of the teeth 133 on member 130 with the teeth 149 on the flange 146 of member 145. In the presently preferred embodiment of the phase adjusting mechanism, the upper and lower clutch assemblies serve for a purpose which will fully appear hereinafter, to interlock the threaded member 134 and spindle 71 when the latter is held against rotation with the crankshaft coupling during engine reversal and phase adjusting operations. To this end then, the teeth of the upper clutch assembly are formed such that each has an abrupt engaging face 152 on one side and a sloping or camming face 153 on the other side, as may be observed in Figs. 5 and 6. As so formed, the clutch teeth 122 and 144 are arranged for coaction such that with the spindle 71 held against rotation, the teeth will engage on their abrupt faces 152 to prevent rotation of the member 134 in the clockwise direction as appears looking axially toward the member from the lower end of Fig. 3. However, the member 134 may be rotated in the reverse or counterclockwise direction, since in that case the camming faces 153 of the clutch teeth 144 will engage the corresponding faces 153 of teeth 122, and will thereby cam the clutch member 116 upwardly against the force of its springs 118, so that the teeth 122 on the latter member will slip in and out of engagement with teeth 144. In the latter instance, therefore, the upper clutch is automatically rendered ineffective to prevent counterclockwise rotation of the member 134. The lower clutch assembly, which functions in a similar manner but oppositely to the upper clutch, has each of its teeth 133 and 149 (Figs. 8 and 9) formed to provide an abrupt engaging face 154 and opposite camming face 156. These teeth as so formed, are arranged for clutch coaction such that they will engage on the abrupt faces 154 to prevent rotation of the member 134 in the counterclockwise direction as appears looking axially toward the member from the lower end of Fig. 3. As before, the member 134 may be rotated in the reverse direction, as clockwise, since the camming faces 156 of the teeth 149 will then engage the corresponding faces 156 of teeth 133 and thereby cam the clutch member 130 downwardly against the action of its springs 132. The teeth 133 thus slipping in and out of engagement with the teeth 149, render the lower clutch ineffective to prevent the clockwise rotation of member 134. Accordingly, it will be observed that the clutch assemblies are oppositely acting, or arranged for relatively reversed operation, in controlling relation to the spindle 71 and member 134, and as so arranged, provide for the proper functioning of the phase adjusting mechanism, as will presently appear.

In threaded engagement with the screw threaded member 134, is a cylindrical member or collar 157 which is formed to provide a laterally projecting, plate-like flange 158 of annular extent, adapted on its outer portion 160 for seating between the opposed flanges 48 and 67 of the coupling members 47 and 66. The bolts 68 heretofore noted, serve to clamp together the coupling flanges and collar flange, so that the collar 157 is thereby rigidly secured to the coupling sleeve 70 for movement therewith. As clearly shown by Fig. 3, the collar 157 is axially recessed, inwardly of its upper end 161, as at 162, the diameter of the recess being somewhat greater than the diameter of the upper clutch flange 141, so that the flange 141 and adjacent parts of the upper clutch assembly may be received in the recess 162 when the collar is disposed in its upper limit of travel (Fig. 3), in which position the upper end 161 of the collar engages and actuates the clutch member 116 against the bias of springs 118, to cause positive disengagement of the clutch.

Carried by the collar and projecting upwardly in the recess 162, is a stop pin 164 which is adapted for abutment with a projection 165 on the periphery of the clutch flange 141 (Figs. 3 and 5), in the uppermost position of the collar. A like recess 166 is provided inwardly of the lower end 168 of collar 157, the recess and collar end cooperating with the lower clutch assembly in the same manner as described for the upper assembly. Similarly also, a stop pin 169 in the lower collar recess 166, is provided for engagement with a projection 170 on the periphery of the lower clutch flange 146, when the collar 157 is disposed in its lower position. The oppositely directed pins 164 and 169 carried by the collar 157, in cooperation with the projections 165 and 170 on the opposite flange elements 141 and 146 of the assembly including the threaded member 134, serve to determine the upper and lower limits of collar displacement along the threaded member 134, as will be now appreciated. In the present embodiment, the pins 164 and 169 are diametrically opposed, as indicated in Fig. 3, and such relation obtains with respect to the flange projections 165 and 170. As so arranged, the extent of threaded travel of the collar along the member 134, is thereby correlated with the angular degree of spiral in the splined connections of the coupling sleeve 70 to the coupling gears 36 and 56, so that in the full displacement of the collar from one limit to the other, the sleeve 70 will be thereby correspondingly displaced to effect the desired total angular shift of the lower crankshaft over the upper crankshaft, as heretofore indicated, whereby to obtain the predetermined desired crank lead in the lower crankshaft assembly. Moreover, the upper pin 164 and projection 165 serve not only to determine the upper limit position of the collar 157 relative to member 134, but through engagement therebetween, to effect a drive connection between the collar and member. The same functions obtain of course, in respect to the lower pin 169 and projection 170.

With the engine operating in the reverse or "astern" direction, the coupling and phase adjusting parts will be disposed as shown in Fig. 3 in particular, and the coupling assembly will be rotating in the clockwise direction as appears looking axially toward the coupling from the lower end, in Figs. 3 and 15. It will be observed that the coupling sleeve 70 and collar 157 are in the upper limit of their displacement, such that the upper end 161 of the collar abuts the member 116 to hold it displaced against the bias of the springs 118, to effect complete disengagement of the clutch teeth 122 thereof, from the clutch teeth 144 on member 141. Also, the stop pin 164 is now in abutment with the projection 165, so that the several parts of the phase adjusting mechanism are now rotating in unison with the crankshaft coupling. While the lower clutch assembly is engaged under the influence of its springs 132, it does not positively interconnect the member 134 and spindle 71 in the clockwise rotation of the coupling, and hence of the member 134, during the normal reverse operation of the engine. This obtains by reason of the form and operative relation of the clutch teeth 133 and 149, as heretofore fully described. However, since the spindle 71 and member 134 are now rotating in unison, the lower clutch will remain engaged and in condition for operation according to its purpose, upon reversal of the engine to the forward direction of operation, as will appear hereinafter. It may be noted here, that in the uppermost position of the collar 157, with the stop elements 164 and 165 engaged, there remains a slight clearance between the bottom surface 172 of the upper recess 162 in collar 157 and the flange 141 as indicated at 173, the clearance being effected in order to prevent an otherwise possible jamming of the collar against the flange with attendant difficulties in breaking the jam upon further operation of the mechanism. For the same reason, a similar clearance is effected between the bottom surface 174 in the lower recess 166 of collar 157, and the clutch flange 146 of the lower clutch assembly, when the collar is disposed in its lowermost limit of movement such that the stop pin 169 abuts the flange projection 170.

Assuming now that it is desired to reverse the engine for operation in the forward or "ahead" direction, the engine reversing and starting system is conditioned by suitable control mechanism hereinafter to be indicated in part, in connection with the diagrammatic views of Figs. 14 and 15, to cause reversed rotation of the crankshafts during the starting period. The crankshaft coupling assembly is correspondingly reversed in rotation, to rotate in the counterclockwise direction as appears looking axially toward the coupling from the lower end, Figs. 3 and 14. Also at this time, fluid pressure as air from the starting system, is admitted to the cylinder 96 to cause outward displacement of the piston-plunger 95 therein. As a result, the plunger roller 98 is brought to bear against the periphery of the spindle clutch plate 87 and in abutment with the plate projection 99, to effect complete rotation stoppage of the spindle 71. The spindle is thus held against rotation until the fluid pressure acting on the piston-plunger 95, is released at or near the end of the engine air-starting period. Through the engaged lower clutch assembly (Fig. 3) between the spindle and threaded gear member 134, the latter will be held against rotation with the collar 157 and coupling sleeve 70, as they rotate with the coupling in the changed direction. This obtains as hereinbefore indicated, because the clutch teeth in the lower clutch assembly are arranged so as to effect positive clutched engagement of the spindle and member 134 in the presently reversed or counterclockwise coupling rotation.

Since the collar 157 continues to rotate with the coupling sleeve 70 in the changed direction, while rotation of the threaded member 134 is prevented, the collar 157 will be displaced or threaded along the member 134 from its uppermost position (Fig. 3) toward its lower limit of displacement, and will carry with it, the coupling sleeve 70. By reason of the oppositely spiralled splined connection of the coupling sleeve 70 to the coupling shaft gears 36 and 56, the resulting longitudinal displacement of the sleeve will effect an advanced or greater rate of rotation of the lower coupling shaft 32 relative to the upper shaft 50. There results from this, as heretofore described, an angular advance of the lower crankshaft over the upper crankshaft, continuing until the collar 157 attains its lower limit of movement, when the lower crankshaft will be advanced to a degree providing the desired crank lead thereof, for normal forward engine operation. In the lower limit of collar displacement, the collar stop pin 169 will abut the clutch flange projection 170, thereby preventing further displacement movement of the collar relative to the threaded member 134. Also, as the collar attains its lower limit, the lower end 168 thereof, engages the clutch member 130 and displaces the same downwardly against the action of springs 132, to effect disengagement of the lower clutch assembly. The threaded member 134 and its associated parts, being thus disconnected from the spindle 71, may then rotate with the collar 157 and coupling sleeve 70 through the drive connection effected upon engagement of the lower pin 169 and projection 170. It is to be noted here, that in the initial displacement of the collar 157 from its uppermost position (Fig. 3), the upper collar end 161 will become disengaged from the clutch member 116, thus freeing the latter for downward displacement under the urge of its springs 118, to engage its clutch teeth 122 with the teeth 144 on the flange element 141. Since during crankshaft phase adjusting displacement of the collar 157 toward its lower limit, the spindle 71 and threaded member 134 are held against rotation, the upper clutch assembly although now engaged, will also remain stationary. But, when the collar 157 reaches its lower limit and disengages the lower clutch, to free the member 134 from spindle 71 for rotation with the collar and coupling assembly, the flange element 141 and its clutch teeth 144 will of course, rotate with the member 134. However, while the upper clutch assembly is engaged, the directioning of the clutch teeth thereof as heretofore indicated, is such as to prevent a positive drive therethrough to the spindle 71, during the presently reversed direction of coupling rotation. More particularly, the cam faces 153 of these teeth function to displace the member 116 so that the teeth 122 thereon slip in and out of engagement with the teeth 144 on member 141. When the spindle 71 is released for rotation with coupling shaft 50, effected when or shortly after the collar 157 reaches its lower limit of travel, the upper clutch assembly will of course, remain engaged and in condition for operation upon a succeeding reversal of engine operation, as from forward to reverse rotation.

It will be observed now, that upon reversal of the engine from forward to reverse operation, the same sequence of operations takes place in the coupling and crankshaft phase adjusting mechanism, but in the reverse direction of rotation and with the upper clutch assembly effective for the purpose described, during the upward displacement of collar 157. In this instance, the displacement travel of collar 157 causes a corresponding displacement of the coupling sleeve 70, the latter effecting as hereinbefore described, an advanced rotation of the lower coupling shaft 32 but in the opposite direction, to effect the desired crank lead of the lower crankshaft for normal reverse or "astern" operation of the engine.

Figure 14:
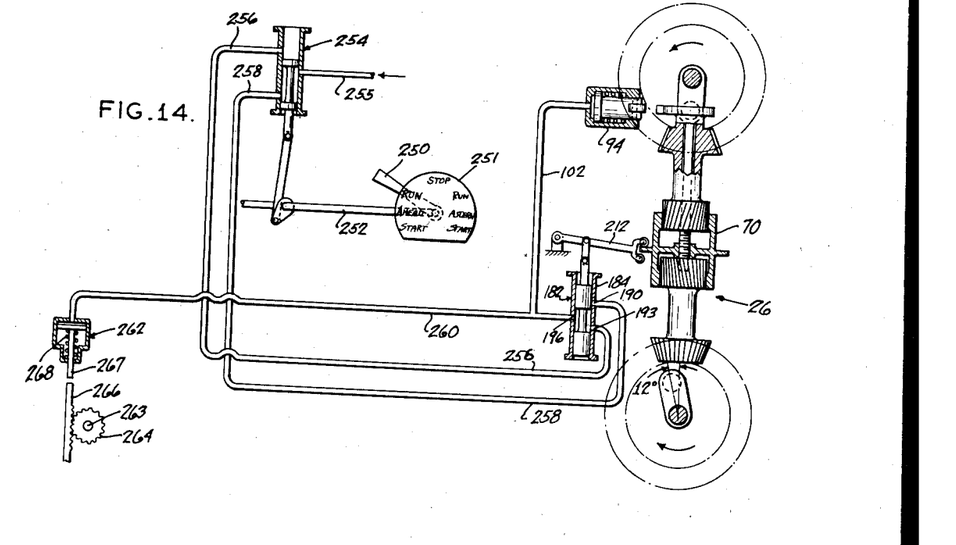
Fig. 14 is a diagrammatic view of the crankshaft coupling and phase adjusting mechanism, and parts of the engine fluid-pressure start and reversing system, as conditioned for normal engine operation in the forward or "ahead" direction.
Figure 15:
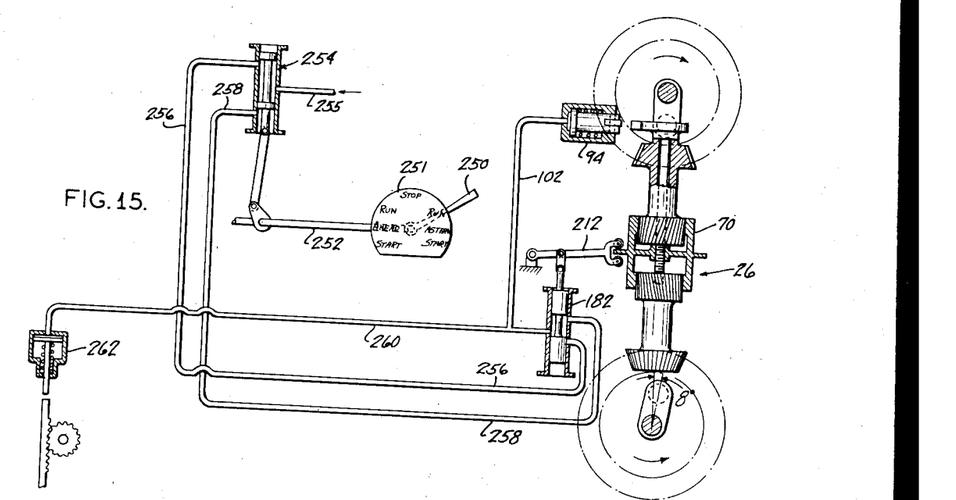
Fig. 15 is a similar diagrammatic view, showing the parts conditioned for reverse or "astern" operation of the engine.

As shown by Figs. 4 and 12 in particular, the phase adjusting displacement movement of the collar 157 and connected coupling sleeve 70, is utilized according to the present exemplary disclosure, to operate and control valve mechanism associated with the engine air-start and reversing system, the latter being diagrammatically illustrated in part, by Figs. 14 and 15. Accordingly, there is provided a ring-like plate 180 which is arranged externally on the coupling sleeve 70, in engagement with the sleeve flange 67 and secured thereto by the bolts 68. A valve supporting frame element or plate 181 is secured to the engine frame, in the zone of the coupling actuated plate 180, and supports a valve structure 182, the latter having a casing 184 provided with a flange 185 which is suitably rigidly secured to the frame, as by the bolts 186. The valve which may be of any well known construction suitable to the present purpose, includes as shown by Figs. 12 and 13, a valve cylinder or liner 188 having a press fit or otherwise secured in the valve casing 184. The liner 188 is provided with a fluid port 189 near its upper end, which is aligned with a fluid passage 190 in the upper portion of casing 184. A similar port 192 is formed in the lower end of the liner, in communication with a fluid passage 193 in the casing, while a third port 194 is provided in the liner substantially midway between its ends, which communicates with a central casing passage 196. A reciprocable valve plunger 197 is operatively seated in the liner 188 and comprises upper and lower bearing plungers 198 and 200 respectively, connected by a stem 201 of reduced diameter, which cooperates with the liner to form the valve chamber 202. The valve plunger 197 when actuated to its upper control position (Figs. 12 and 13) opens the valve chamber 202 to the upper port 189 and casing passage 190, and to the central port 194 and casing passage 196. When actuated to its lower position, as indicated in Fig. 14, the valve chamber is open to the central passage and port, and to the lower liner port 192 and casing passage 193. In intermediate positions of the valve plunger, the upper and lower ports 189 and 192 will be closed by the plunger elements 198 and 200 respectively. However, for a purpose which will presently appear, a by-pass passage 204, controlled by a spring-loaded ball valve 205, is provided between the upper casing passage 190 and a liner port 206 located above, but relatively adjacent the central liner port 194. Similarly, a by-pass passage 208 (Fig. 13) having a spring-loaded ball valve 209 therein, is provided between the lower casing passage 193 and a liner port 210 below, but relatively adjacent the central port 194.

A valve actuating arm 212 has one end 213 pivoted to the frame plate 181, as by a pivot pin or stud 214, and is arranged so that its opposite end 216 is disposed adjacent the periphery of the plate 180 on the coupling assembly (Fig. 4). The latter arm end provides an integral extension 217 projecting laterally of the arm, and in which are formed slots 218 each receiving a stud element 220 therethrough. As appears in Figs. 4 and 12, each stud is adapted to be clamped to the arm extension 217 in any adjusted position along its slot, by a stud flange 221 and clamping nut 222, and is further adapted through a stud extension 224 beyond the flange 221, for the support of a roller 225 thereon, the roller being free on the stud extension and retained thereon by a nut 226. In assembly, the ring plate 180 has its peripheral portion located between the rollers 225, so that upon displacement movement of the plate 180 effected as heretofore described, the plate will engage one or the other of the rollers, and thus pivotally actuate the arm 212. Since the plate 180 rotates with the crankshaft coupling assembly during engine starting or reversing operations, as well as during normal engine operation in either direction, the rollers 225 serve to reduce friction and wear in the contact of the plate 180 therewith.

The upper end 228 of the valve plunger 197 is operatively connected to arm 212 by a link element 229 having a pivotal connection 230 to the end 228, and a similar pivotal connection 232 to an intermediate portion of the arm 212. It will be observed now, that the extent of pivotal movement of arm 212 is determined, through plate 180, by the predetermined extent of displacement movement of the crankshaft coupling sleeve 70, as this is indicated by the diagrammatic views of Figs. 14 and 15. However, in order to further reduce wear between the rollers 225 and plate 180, the present valve actuating arrangement is such that in the upper pivotal limit of arm 212 corresponding to the upper displacement limit of plate 180 (Fig. 12) both rollers 225 are clear of contact with the plate. This is attained through a spring-loaded plunger 233 (Fig. 4) carried by the arm 212, and provided with a substantially frusto-conical end 234 for seating in a similarly shaped recess 236 at the upper end of a frame extension 237 on frame 181. The location of the recess 236 is such that upon upward pivotal movement of arm 212 by plate 180 in engagement with the upper roller 225, the plunger 233 is not thereby brought into full seating registry with the recess when the plate 180 attains its upper displacement limit. At such time, however, and by reason of the frusto-conical surfaces of the recess and plunger end, the plunger will be cammed into the recess by the force of its biasing spring 238, with the consequence that the arm 212 is thereby pivoted upwardly to an additional extent, as to the position shown in Fig. 12 wherein the rollers 225 are clear of the plate 180. A like recess 240 is located near the lower end of the frame extension 237, and cooperates with the plunger 233 as above described, when the plate 180 actuates the arm 212 downwardly from its upper limit. The lower limit positions of the plate 180 and arm 212 are indicated by the broken lines in Fig. 12, and here again, the rollers 225 are free of the plate 180. The extent of pivotal, valve operating movement of arm 212 is thus determined by the spacing of the plunger seats 236 and 240. Accordingly, the operative connection of the valve plunger 197 to the arm 212 is made at a point along the arm such that the valve will be fully operated in response to pivotal movement of the arm from one limit to the other.

Referring now to the diagrammatic view of Fig. 14, which illustrates a part of the engine starting and reversing system, and shows the crankshaft coupling and phase adjusting mechanism conditioned for engine operation in the forward or "ahead" direction, there is shown the usual, manually operated, engine starting and reversing control lever 250 and associated indicator dial 251. The lever 250 operates a main control shaft 252, from which is operated an air control valve 254. Air under pressure from a suitable source (not shown) is conducted to valve 254 through a conduit 255, and is directed selectively by the valve, into one or the other of the air delivery conduits 256 and 258. The valve also operates to open one of the conduits to atmosphere when it interconnects the other conduit to the air pressure supply as this readily appears in Fig. 14. In the present example, the conduit 256 leads to the air passage 193 in the valve casing 184 (Fig. 13) of the coupling controlled valve 182, while the other conduit 258 leads to the casing passage 190 of valve 182 (Fig. 12). A conduit 102 heretofore noted, connects the central casing passage 196 of valve 182, with the cylinder 96 of device 94 containing the plunger 95, the latter being adapted for cooperation with the spindle 71 of the crankshaft phase adjusting mechanism, as heretofore described. A branch line 260 leads from the conduit 102 to the cylinder of an air-operated servo-motor 262 which is operatively associated with the engine cylinder fuel pumps (not shown), through a control shaft 263, gear 264 and gear-rack 266, the latter being directly actuated by the servo-motor. When not opposed by air pressure admitted to the servo-motor, the piston plunger 267 thereof is retracted by a suitable spring 268, to clear the same from the upper end of the rack 266, so that the fuel pumps may be operated for fuel delivery, as controlled by the usual engine speed governor or other speed control means (not shown). However, when the servo-motor is operated by air pressure, the plunger 267 thereof will be projected into abutment with the rack 266 to cause downward displacement thereof, and thus actuate the shaft 263 through gear 264, in the direction to reduce or completely shut off further fuel supply by the fuel pumps. This latter control provides a safety feature, which serves to prevent premature engine firing during the starting period.

As shown by Fig. 14, the control system is conditioned for normal engine operation in the forward direction, the main control lever 250 being in the "ahead-run" position, which, through the control shaft 252, positions the valve 254 for delivery of compressed air into conduit 258, and for opening the conduit 256 to atmosphere, in order to exhaust therethrough, air under pressure which would be otherwise trapped in the system. The crankshaft coupling sleeve 70 now being in its lower position, thereby positions the valve 182 in its lower control position, wherein the conduit 258 is closed, and the conduit 256 opened to the conduits 102 and 260 to exhaust the air therefrom.

When it is desired to reverse the engine, as from forward or "ahead" to reverse or "astern" operation, the control lever 250 is moved clockwise (Fig. 14) to the "astern-start" position relative to the dial 251. The control shaft 252 is thereby operated to condition the engine air starting means (not shown) for starting the engine in the reverse direction. The shaft 252 also operates the air valve 254 to effect delivery of air under pressure to the conduit 256, and since the valve 182 is positioned as shown in Fig. 14 at the start of engine reversal, air pressure is delivered therethrough to the conduit 102, and through the latter to the device 94 for operation of the plunger 95. The plunger thus operated, affects the spindle 71 of the crankshaft phase adjusting mechanism in the manner heretofore described, to prevent spindle rotation with the coupling assembly as the latter is reversed in rotation. At the same time, air pressure is delivered through conduit 260 to the servo-motor 262, thus causing operation thereof to shut off the cylinder fuel pumps during the engine starting period, as heretofore indicated. As the coupling sleeve 70 is caused to move upwardly toward its upper limit (Fig. 15), in the manner fully disclosed hereinbefore, the plate 180 thereon actuates valve 182 toward its upper control position. During such valve operation, the lower valve plunger 200 will close the valve chamber 202 to the conduit 256 through port 192, but compressed air delivery to conduits 102 and 260 will nevertheless, continue through the lower by-pass 208, until the valve plunger 200 closes the by-pass cylinder port 210 (Fig. 13) at or about the time when the coupling sleeve 70 and valve-actuating plate 180 thereon, attain the upper limit position.

When the coupling sleeve 70 attains its upper limit (Fig. 15) through operation of the crankshaft phase adjusting mechanism associated therewith, the lower crankshaft will be properly advanced to obtain the desired crank lead thereof for normal forward engine operation. Coincidentally therewith, the valve 182 will be positioned as shown by Fig. 15, in its upper control position, wherein the upper plunger element 198 opens the upper valve port 189 to the valve chamber 202 (Fig. 12), and thereby effects communication between the conduits 102 and 260 and the conduit 258. Since the latter is open to atmosphere through valve 254, the air pressure in the conduits 102 and 260 will be exhausted to atmosphere, and thus permit retraction of the plunger 95 to release the spindle 71, for rotation with the coupling assembly, and also, permitting retraction operation of the servo-motor 202, whereby to recondition the fuel pumps for normal fuel delivery to the engine. At this time, the control lever may be moved counterclockwise, from the "start" position to "run" position in the reverse or "astern" direction of engine operation. The engine then is operating in the reverse direction, and the control elements of the reversing and phase adjusting system are positioned as shown by Fig. 15. The same sequence of operations but in the reverse order, occur upon further reversal of the engine, as to the forward or "ahead" operation, wherein the control elements will be repositioned as shown in Fig. 14. During reversal in this case, it will be observed that the upper by-pass 204 in valve 182, will function exactly as the lower by-pass, during valve operation by ring 180.

While the crankshaft phase adjusting and reversing improvements effected by the present invention, have been described in connection with but a single preferred embodiment thereof, it will be understood that various modifications in the parts and their arrangement may be made without departing from the scope and full intendment of the invention, as defined by the claims appended hereto.

I claim:

1. In a reversible internal combustion engine of opposed piston type, having spaced crankshafts, a rotation synchronizing drive connection for said crankshafts, said connection including shaft elements rotatably connected to the crankshafts, and coupling means for said shaft elements, effective during forward or reverse operation of the engine, to interconnect the shaft elements for synchronous rotation, said coupling means including a member rotatably interconnecting said shaft elements and shiftable longitudinally thereof between predetermined limits, adapted for effecting upon shifting movement between said limits, a limited relative rotation of said shaft elements, whereby to effect a predetermined angular lead of one crankshaft over the other in both forward and reverse operations of the engine, and control means associated with said shiftable member and operative responsively to reversals of engine operation, to cause shifting of said member to effect said limited relative rotation of the shaft elements.

2. In a reversible internal combustion engine of opposed piston type, having spaced crankshafts, a rotation synchronizing drive connection for said crankshafts, said connection including shaft elements extending transversely of the crankshafts and rotatably connected thereto, and coupling means between said shaft elements, effective during forward or reverse operations of the engine, to interconnect the shaft elements for synchronous rotation, said coupling means including a member shiftable axially of the shaft elements between predetermined limits and being so operatively connected to the shaft elements as to effect through shifting movement thereof, a limited relative rotation of the shaft elements, whereby to effect a predetermined angular lead of one crankshaft over the other in both forward and reverse operations of the engine, and control means associated with said coupling means and operative responsively to reversals of engine operation, to cause shifting movement of said member.

3. In a reversible internal combustion engine of opposed piston type, having spaced crankshafts, the combination of a rotation synchronizing drive connection for said crankshafts, said drive connection including rotary elements operatively connected to the crankshafts, and coupling means between said rotary elements, effective during normal forward or reverse operation of the engine, to interconnect the rotary elements for synchronous rotation, and engine reversing control means operatively associated with said coupling means, said coupling means being adapted for operation responsively to actuation of said control means and to reversals in the direction of rotation of said rotary elements, to cause relative rotation of the rotary elements, whereby to effect a predetermined angular lead of one crankshaft over the other in both forward and reverse operations of the engine.

4. In a reversible internal combustion engine of opposed piston type, having spaced crankshafts, the combination of a rotation synchronizing drive connection for said crankshafts, said drive connection including shaft elements in substantial axial alignment and operatively connected to the crankshafts, and adjustable coupling means between said shaft elements, effective during normal forward or reverse operation of the engine, to interconnect the shaft elements for synchronous rotation in one direction or the other corresponding to the forward or reverse engine operation, and engine reversing control means including a control member operatively associated with said coupling means, said control member being adapted for effecting adjustment of said coupling means in response to actuation of said reversing control means and to the resulting reversal in the direction of rotation of said shaft elements, to effect relative rotation of the shaft elements, whereby to effect a predetermined angular lead of one crankshaft over the other in both forward and reverse operations of the engine.

5. In a reversible engine of the type described, characterized by spaced crankshafts, a rotation synchronizing drive connection for said crankshafts, said drive connection comprising axially alinged shaft elements each rotatably connected to one of the crankshafts and adjustable coupling means between said shaft elements, said coupling means being effective during normal forward or reverse operations of the engine, to interconnect the shaft elements for maintaining synchronous rotation of the crankshafts in a given phase relationship such that one crankshaft leads the other by a predetermined angle, and adjustment control means operatively associated with said coupling means, said coupling means being adjustable automatically in responsive to actuation of said control means and to reversed rotation of said shaft elements upon reversal of engine operation, to effect a limited relative rotation of said shaft elements, whereby to cause a predetermined angular advance of one crankshaft relative to the other to thereby determine the phase relationship of the crankshafts in the forward or reverse operation of the engine.

6. In a reversible internal combustion engine of opposed piston type, having spaced crankshafts, the combination of a rotation synchronizing drive connection for said crankshafts, said drive connection including shaft elements extending transversely of the crankshafts and rotatably connected thereto, and coupling means between said shaft elements, effective during normal forward or reverse operation of the engine, to interconnect the shaft elements for synchronous rotation, said coupling means including a member capable of limited displacement axially of the shaft elements and being so connected to said shaft elements as to effect through displacement thereof, a limited relative rotation of the shaft elements, whereby to effect a predetermined angular lead of one crankshaft over the other in both forward and reverse operations of the engine, and engine reversing control means including a control element in displacement controlling relation to said member, said control element being adapted for causing displacement of said member in response to operation of said control means and to reversed rotation of said shaft elements.

7. In a reversible internal combustion engine of opposed piston type, having spaced crankshafts, a rotation synchronizing drive connection for said crankshafts, including shaft elements in substantial axial alignment and each operatively connected to one of the crankshafts, coupling means between said shaft elements comprising a coupling member rotatable with the shaft elements and capable of displacement axially thereof, between predetermined limits, a control member normally rotatable with said coupling member when the latter is disposed in either limit of its displacement, said control member being operable to cause displacement of said coupling member upon reversal of engine operation to effect reversed rotation of said shaft elements and coupling member, said coupling member being adapted to effect through displacement thereof between said limits, relative rotation of the shaft elements, whereby to effect a predetermined angular lead of one crankshaft over the other in both forward and reverse operations of the engine, and means effective upon reversals of engine operation, to operate said control member to cause displacement of said coupling member.

8. In a reversible internal combustion engine of opposed piston type, having spaced crankshafts, a rotation synchronizing drive connection for said crankshafts, said drive connection including shaft elements in substantial axial alignment and operatively connected to the crankshafts, and coupling means between said shaft elements, effective during normal forward and reverse operation of the engine, to interconnect the shaft elements for synchronous rotation in one direction or the other according to the direction of engine operation, said coupling means including a member rotatable with said shaft elements and capable of a limited displacement movement axially thereof, said member being so connected to said shaft elements as to effect upon displacement of the member, a limited relative rotation of the shaft elements, whereby to effect a predetermined angular lead of one crankshaft over the other in both forward and reverse operations of the engine, a second member rotatable with the first said member during normal engine operation in either direction and being so connected to the first said member as to cause displacement thereof when said second member is held against rotation, and control means operable during reversal of engine operation, to hold said second member against rotation.

9. In a reversible internal combustion engine of opposed piston type, having spaced crankshafts, a rotation synchronizing drive connection for said crankshafts, said drive connection including shaft elements in substantial axial alignment and operatively connected to the crankshafts, and coupling means between said shaft elements, including a member rotatable with the shaft elements and capable of displacement axially thereof, between predetermined limits, a second member, means associated with said members and effective in either displacement limit of the first said member, to connect the members for synchronous rotation, said second member being operatively connected to the first said member and adapted to cause displacement thereof when the second member is held against rotation, the first said member being operatively connected to said shaft elements such as to effect relative rotation thereof upon displacement of the member between said limits, whereby to effect an angular lead of one crankshaft over the other in both forward and reverse operations of the engine, and control means effective during reversal of engine operation, to hold said second member against rotation.

10. In a reversible engine of the type described, having spaced crankshafts, a rotation synchronizing drive connection for said crankshafts, said drive connection comprising shaft elements extending transversely of the crankshafts and rotatably connected thereto, a coupling member between said shaft elements and capable of displacement movement axially thereof, between predetermined limits, said coupling member being operatively connected to the shaft elements in a manner to effect relative rotation thereof through displacement of the coupling member between said limits, whereby to effect a predetermined angular lead of one crankshaft over the other in both forward and reverse operations of the engine, a displacement control member for said coupling member, effective when the control member is held against rotation while the coupling member is reversed in rotation upon reversal of engine operation, to cause displacement of the coupling member, a control element normally rotatable with said shaft elements, means operable responsively to reversals of engine operation, for preventing rotation of said control element, and clutch means between said control element and said displacement control member, effective upon reversed rotation of said coupling member and rotation stoppage of said control element, to interconnect the control element and control member for holding the control member against rotation.

11. In a reversible internal combustion engine of opposed piston type, having spaced crankshafts, a rotation synchronizing drive connection for said crankshafts, said drive connection comprising shaft elements in substantial axial alignment and operatively connected to the crankshafts, a control element rotatable with the shaft elements during normal forward or reverse operation of the engine, a coupling member for said shaft elements capable of displacement axially thereof between predetermined limits, said coupling member being operatively connected to the shaft elements and adapted for effecting relative rotation thereof upon displacement of the coupling member between said limits, whereby to effect a predetermined angular lead of one crankshaft over the other in both forward and reverse operations of the engine, a rotatable intermediate member arranged on said control element in displacement controlling engagement with said coupling member, said intermediate member being effective when held against rotation, for causing displacement of said coupling member, means effective when said coupling member is disposed in either limit of its displacement, to connect said members for conjoint rotation, means responsive to reversals of engine operation for preventing rotation of said control element, and clutch means between said control element and said intermediate member, operable in response to reversed rotation of said shaft elements and coupling member, to interconnect the control element and intermediate member for holding the latter against rotation with said coupling member, whereby to effect displacement of the coupling member.

12. In a reversible engine of the type described, having spaced crankshafts, the combination of a rotation synchronizing drive connection for said crankshafts, said connection, including shaft elements in substantial axial alignment and rotatably connected to the crankshafts, coupling means between said shaft elements, capable of limited displacement axially of the shaft elements and being operatively connected thereto such as to effect relative rotation of the shaft elements through displacement of the coupling means, whereby to effect a predetermined angular lead of one crankshaft over the other in both forward and reverse operations of the engine, displacement control means operatively associated with said coupling means and normally rotatable with the coupling means and shaft elements, said control means being effective to cause displacement of said coupling means when held against rotation, engine reversing mechanism, and a control device operated by said reversing mechanism, for releasably holding said control means against rotation.

13. The combination in a reversible engine of the type described, having spaced crankshafts, of a rotation synchronizing drive connection between said crankshafts, said connection including shaft elements in substantial axial alignment and each rotatably connected to one of the crankshafts, a coupling member between said shaft elements and movable axially thereof between predetermined limits, said member being operatively connected to the shaft elements such that movement thereof between said limits effects a limited relative rotation of the shaft elements, whereby to effect a predetermined angular lead of one crankshaft over the other in both forward and reverse operations of the engine, a control member for said coupling member, connector means associated with said members, effective to connect said members for conjoint rotation when said coupling member is disposed in either limit of its movement, said control member being operatively associated with said coupling member and effective when held against rotation, to cause movement of the coupling member between said limits when the latter member is reversed in rotation responsively to reversal of engine operation, a control shaft normally rotatable with said shaft elements, engine reversing mechanism, means operated by said reversing mechanism to releasably hold said control shaft against rotation, and clutch means associated with said control shaft and control member, effective upon rotation stoppage of said control shaft and reversed rotation of said coupling member, to interconnect the control shaft and control member, whereby to hold said control member against rotation.

14. In a reversible engine of opposed piston type, having spaced crankshafts, the combination of a rotation synchronizing drive connection for said crankshafts, said connection including shaft elements each operatively connected to one of the crankshafts and a coupling device interconnecting said shaft elements, said coupling device being operable during reversals of engine operation, to effect a limited relative rotation of the shaft elements, whereby to adjust the phase relationship of said crankshafts such that one thereof leads the other by a predetermined angle in both the forward and reverse operations of the engine, engine fuel supply means, and engine reversing control means in controlling association with said coupling device and fuel supply means, operable during engine reversal, to cause crankshaft phase adjusting operation of said coupling device and to render said fuel supply means ineffective for supplying fuel to the engine.

15. In a reversible engine of opposed piston type, having spaced crankshafts, the combination of a rotation synchronizing drive connection for said crankshafts, said connection including shaft elements each operatively connected to one of the crankshafts and a coupling device interconnecting said shaft elements, said coupling device being operable during reversals of engine operation, to effect a limited relative rotation of the shaft elements, whereby to adjust the phase relationship of said crankshafts such that one thereof leads the other by a predetermined angle in both the forward and reverse operations of the engine, engine fuel supply means, engine reversing control means in controlling association with said coupling device and fuel supply means, operable during engine reversal, to cause crankshaft phase adjusting operation of the coupling device and to render said fuel supply means ineffective for supplying fuel to the engine, and means operated by said coupling device during its crankshaft phase adjusting operation, effective when said coupling device completes its phase adjusting operation, for terminating operation of said reversing control means.

HANS DAVIDS.